United States Patent
Vinson

(10) Patent No.: US 12,114,029 B1
(45) Date of Patent: Oct. 8, 2024

(54) SYSTEMS AND METHODS OF PERSONIFYING VIEWERSHIP DATA

(71) Applicant: Comscore, Inc., Reston, VA (US)

(72) Inventor: Michael J. Vinson, Piedmont, CA (US)

(73) Assignee: Comscore, Inc., Reston, VA (US)

(*) Notice: Subject to any disclaimer, the term of this patent is extended or adjusted under 35 U.S.C. 154(b) by 5 days.

(21) Appl. No.: 18/196,404

(22) Filed: May 11, 2023

(51) Int. Cl.
*H04N 21/25* (2011.01)
*G06N 3/0895* (2023.01)
*H04N 21/24* (2011.01)

(52) U.S. Cl.
CPC ......... *H04N 21/252* (2013.01); *G06N 3/0895* (2023.01); *H04N 21/2407* (2013.01)

(58) Field of Classification Search
CPC . H04N 21/252; H04N 21/2407; G06N 3/0895
See application file for complete search history.

(56) References Cited

U.S. PATENT DOCUMENTS

| | | | |
|---|---|---|---|
| 9,800,913 B2 | 10/2017 | Levande et al. | |
| 2016/0249098 A1* | 8/2016 | Pecjak | H04N 21/44222 |
| 2021/0377611 A1* | 12/2021 | Bress | H04N 21/442 |

FOREIGN PATENT DOCUMENTS

WO   WO-03090466 A2 * 10/2003 ............. H04N 7/173

\* cited by examiner

*Primary Examiner* — Anthony Bantamoi
(74) *Attorney, Agent, or Firm* — Blank Rome LLP

(57) ABSTRACT

A method may include receiving training data including tuning data, household member data, and initial person level distributions. The method may further include aggregating the tuning data from one or more user devices associated with a household to generate an observed household distribution, and calculating, via a prediction model, an implied household viewership distribution based on the person level distribution associated with one or more members of the household. The method may further include comparing the implied household distribution to the observed household distribution of the household, adjusting the prediction model and/or the person level distributions such that the implied household distribution more closely aligns with the observed household distribution, and generating a report with the person level distributions. A system and a non-transitory computer-readable medium may perform the method.

20 Claims, 5 Drawing Sheets

FIG. 4

PERSON LEVEL DISTRIBUTIONS (410)

| demo# | demo | Prob |
|---|---|---|
| 1 | P18-34 | 0.2 |
| 2 | P35-64 | 0.5 |
| 3 | P65+ | 0.7 |

412, 414, 416

HOUSEHOLDS (420)

| HH size: 1 | |
|---|---|
| HH1 | demo_p |
| p1 | 1 |
| p2 | 0 |
| p3 | 0 |
| $Prob_C(H|P)$ | 0.2 |

422, 424, 426, 428

| HH size: 1 | |
|---|---|
| HH2 | demo_p |
| p1 | 3 |
| p2 | 0 |
| p3 | 0 |
| $Prob_C(H|P)$ | 0.7 |

| HH size: 3 | |
|---|---|
| HH3 | demo_p |
| p1 | 1 |
| p2 | 1 |
| p3 | 1 |
| $Prob_C(H|P)$ | 0.488 |

| HH size: 2 | |
|---|---|
| HH4 | demo_p |
| p1 | 3 |
| p2 | 1 |
| p3 | 0 |
| $Prob_C(H|P)$ | 0.76 |

400

SYSTEMS AND METHODS OF PERSONIFYING VIEWERSHIP DATA

TECHNICAL FIELD

This disclosure relates generally to systems and methods of monitoring and predicting viewership to enhance quality of data. More particularly, disclosed are systems and methods of personifying household viewership data by estimating the person or persons within a household who are doing the viewing.

BACKGROUND

Current systems monitor viewership at the household level with various techniques in order to measure the audience. More specifically, current systems often attempt to obtain viewership data from content providers and attempt to assign the data to a specific household to characterize the household level viewership. Content providers may then attempt to use this household viewership data to understand, measure, and/or customize advertising content to the specific household.

SUMMARY

However, custom advertising content of the current systems is not completely effective without determining who in the household is actually viewing the content. Personal viewing behaviors are constantly changing based on evolving household environments, and the amount of content available for viewing is ever-increasing, making it difficult to measure person level viewing behaviors in a household of two or more members using traditional sample-based based datasets. One difficulty in obtaining person level viewing data is due to co-viewership where multiple members of the household watch the same content at the same time. The foregoing needs are met by the various embodiments of systems and methods disclosed herein.

In one aspect, a computerized method may include receiving training data including tuning data, household member data, and initial person level distributions: aggregating the tuning data from one or more user devices associated with a household to generate an observed household distribution: calculating, via a prediction model, an implied household viewership distribution based on the person level distribution associated with one or more members of the household: comparing the implied household distribution to the observed household distribution of the household: adjusting the prediction model and/or the person level distributions to more closely align with the observed household distribution; and generating a report with the person level distributions.

Another aspect is directed to a system including at least one processor, and at least memory storing instructions that, when executed, cause the at least one processor to perform the method described above. Yet another aspect is directed to a non-transitory computer-readable medium storing instructions which, when executed, cause at least one processor to perform the method described above.

BRIEF DESCRIPTION OF THE DRAWINGS

The present application is further understood when read in conjunction with the appended drawings. For the purpose of illustrating the subject matter, there are shown in the drawings exemplary embodiments of the subject matter: however, the presently disclosed subject matter is not limited to the specific methods, devices, and systems disclosed. In the drawings:

FIG. 4 illustrates exemplary datasets determining implied household distributions based on person level distributions of the members.

DETAILED DESCRIPTION OF ILLUSTRATIVE EMBODIMENTS

A personification solution is described that takes advantage of a massive and passive dataset of audience information to extract reliable person level audience estimates at granular levels in multiple contexts, including local market, cross-platform, and over-the-top (OTT). As discussed herein, "personification" is a statistical inference process by which household (HH) level media consumption data is assigned to, or allocated to, the members or persons within the HH. The process may begin with measurement of household level tuning, obtained for example from monitoring software and/or content providers. This may be a massive data footprint consisting of viewership tunes at the rate of billions of events per day coming from more than 75 million STBs in over 30 million households. Reliable and valid demographic information is obtainable for a large portion of these households. However, this household centric measurement may have a limitation in that it is only known that a device was tuned to some channel at some time, somewhere in the HH, but not who in the HH is watching. Said differently, the measurement captures three out of four dimensions of viewership: what was watched, when it was watched, how much was watched, but not who watched.

The present disclosure is based on a premise that a household-level measurement of content viewership when performed at scale contains encoded signals that can be used to infer the demographics of the viewers. A statistical "decoder" that can extract those signals and predict the demographic composition of the viewers. This is where massive, passive, and deterministic household viewership information combined with household data of known rosters of members and/or Bayesian statistics makes the difference. For example, in some embodiments, the present disclosure may leverage a panel-based training dataset to personify (e.g., predicting who watched) content of national cross-platform measurement. The training dataset comprised of a small sample (a few thousand households) of live and time-shifted content viewership at the person level and served as a good-for-fit dataset for the purpose-at-hand. However, the training dataset has some limitations in personifying a wide variety of content in a reliable manner due to insufficient coverage at various levels in the content hierarchy (ex: Network, Series, Programs, or Genre) and uneven quality of the panel sample in general. With the reality being there exists no sample-based training dataset that is big enough to personify the vastness of content available and viewed today, the present application provides big-data analytics and modeling to solve the personification problem. However, in some embodiments, the present disclosure may additionally or alternatively use the panel-based dataset as a post-hoc validation data set.

Figure 1:
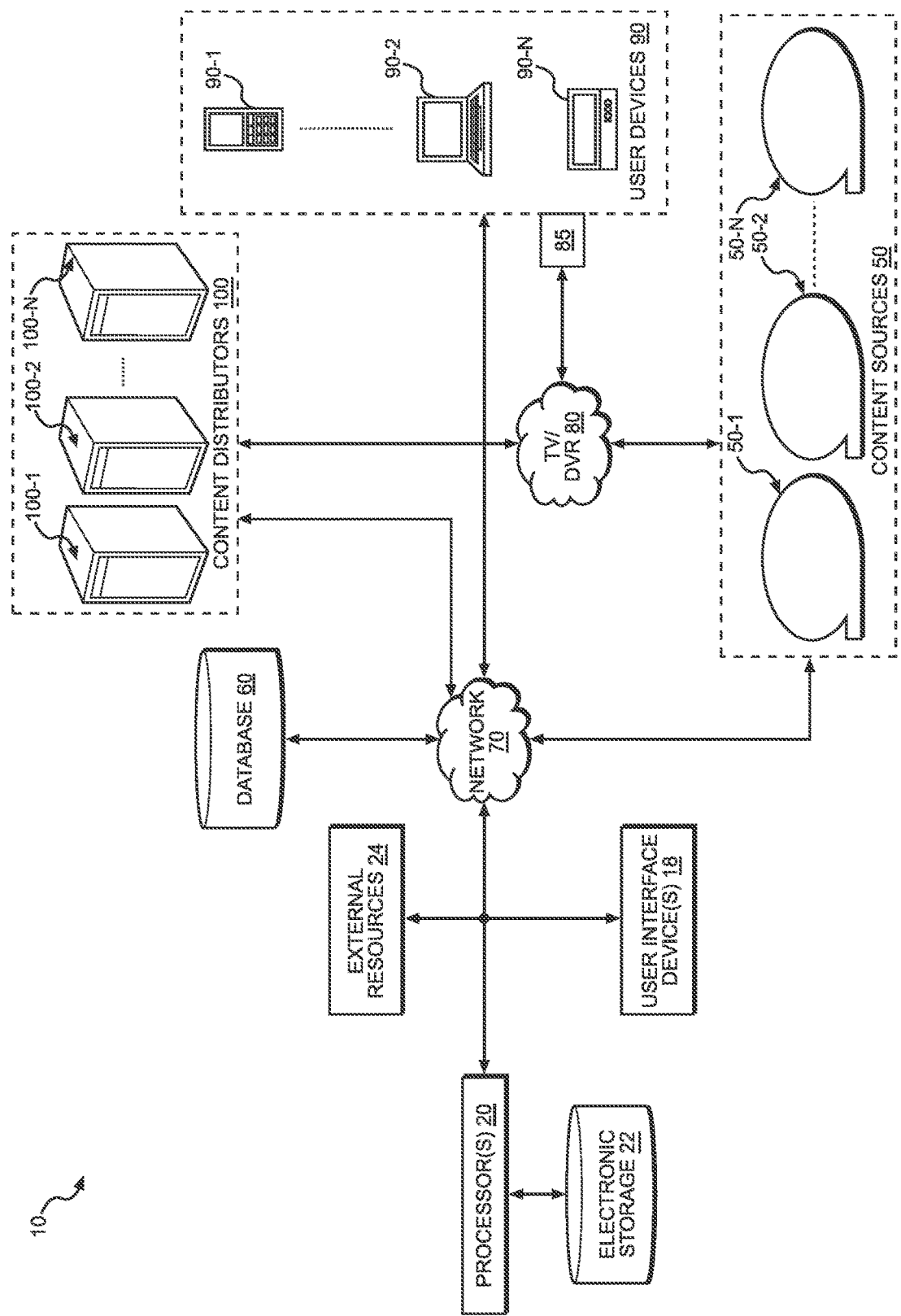
FIG. 1 illustrates an exemplary system in which a multitude of data from multiple sources is collected and analyzed for personifying viewership data.

FIG. 1 illustrates a system 10 configured to obtain and leverage high-resolution viewership data with respect to a plurality of different views of content by a plurality of different users/devices of a plurality of different pieces of the content of a plurality of different sets of pieces of content of a plurality of different channels/stations each distributed by a plurality of different distributors. The system 10 is further configured to train a prediction model and then to use the prediction model to predict person level viewership. As such, the system 10 may be configured to predict or detect subtle issues with high levels of granularity and accuracy.

Each telecast or piece of streamed content may be a local or national program, such as a local morning news, an episode of a popular television show, or a national basketball association (NBA) playoff game. The content may be aired via a certain station or channel, with a specific start-time and run-time. Some embodiments may obtain, predict, and/or validate viewership data at a granular level, such as audience viewing durations measured in portions of an hour (e.g., 5 minutes, 15 minutes, 30 minutes, and/or 45 minutes). System 10 may train a model to predict viewership data at a granular level. In some embodiments, this is done without need of human involvement.

Some embodiments may adapt machine-learning techniques to a practical application, namely the technological management of online and/or television viewership data, e.g., for predicting person level viewership. Some embodiments may operate artificial intelligence (AI). The prediction models may be and/or include one or more neural networks (e.g., deep neural networks, artificial neural networks, and/or other neural networks), other machine learning models, or other prediction models. An artificial neural network is a network or circuit of artificial neurons or nodes for solving particular AI problems. Such artificial networks may be used for predictive modeling. These models may be self-learning and trained, rather than explicitly programmed, and can perform significantly better in certain areas of problem solving, as compared to traditional computer programs. In some embodiments, the predictive models are based on conditional probability according to Bayes Theorem.

Once trained, a prediction model obtained from a database 60) may operate at a rate of thousands, millions, or even billions of predictions per minute. Training and testing data may thus prepare one or more prediction models to generate predictions. For example, a prediction model may analyze its predictions against a reference set of data called the test dataset. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to viewership numbers. For example, a labeled training set may enable model improvement. That is, the prediction model may use a validation set of data to iterate over model features until the point where it arrives at a final set of features or weights to use in the model.

In some embodiments, the inputs to the prediction models are tuning data, household member data, and person level distributions. The prediction models may update and refine the person level distributions to determine the probability of users watching content. The determinations may be based on comparing an observed household viewership distribution calculated based on household tuning data to an implied household distribution calculated based on the person level distributions. The person level distributions may be initially obtained through household tuning data with a single member, survey data, and/or panel data and be refined and updated to obtain a closer indication of viewership habits. The person level distribution may be based on demographics and thus be applicable across local, regional, national, and/or international populations. Thus, the prediction models may provide valuable insights into viewership of large populations across platforms.

For example, the implied household distribution may be based on a finite number of demographic categories or buckets to facilitate the viewership determinations. The categories may be broken down based on 11 age groups and 2 genders. Thus, the determination of person level viewership may be based on 22 values. For example, if the probability of a female 25 to 34 years old watching a particular program is, say, 5%, then the probability of a single-person household with one F25-34 to watch would be 5%. Further to this theory, a two-person household with two F25-34s would have a probability of 9.75% of watching it. If each of the two persons in this household have a 5% chance of viewing, then each has a 95% chance of not viewing, so the probability that person 1 did not watch and person 2 did not watch is 0.95*0.95=0.9025, or, in other words, the probability that at least one did watch is 1−0.9025=0.0975 or 9.75%. Real viewing probabilities however are never so black-or-white as discussed herein, but nevertheless it is true that correlations between age/gender presence and viewing propensities can lead to an estimate of who is doing the viewing. Thus, the prediction models as discussed herein factor in such variables as demographics and/or size of the household.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). The electronic storage 22 may be (in whole or in part) a separate component within system 10, or electronic storage 22 may be provided (in whole or in part) integrally with one or more other components of system 10 (e.g., a user interface device 18, at least one processor 20, etc.). In some embodiments, electronic storage 22 may be located in a server together with the processor 20, in a server that is part of external resources 24, in user interface devices 18, and/or in other locations. The electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. The electronic storage 22 may store software algorithms, information obtained and/or determined by the processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network (e.g., the Internet), electronic storage, equipment related to Wi-Fi technology, equipment related to Bluetooth® technology, data entry devices, and/or other resources. In some implementations, some or all of the functionality attributed herein to the external resources 24 may be provided by resources included in system 10. The external resources 24 may be configured to communicate with the processor 20, user interface device 18, electronic storage 22, and/or other components of system 10 via wired and/or wireless connections, via a network (e.g., a local area network and/or the Internet), via cellular technology, via Wi-Fi technology, and/or via other resources.

User interface device(s) 18 of system 10 may be configured to provide an interface between one or more users and system 10. The user interface devices 18 may be configured to provide information to and/or receive information from the one or more users. The user interface devices 18 may include a user interface and/or other components. The user interface may be and/or include a graphical user interface configured to present views and/or fields configured to receive entry and/or selection with respect to particular functionality of the system 10, and/or provide and/or receive other information. In some embodiments, the user interface of the user interface devices 18 may include a plurality of separate interfaces associated with the processor 20 and/or other components of the system 10. Examples of interface devices suitable for inclusion in the user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 may include a removable storage interface. In this example, information may be loaded into user interface devices 18 from removable storage (e.g., a smart card, a flash drive, a removable disk) that enables users to customize the implementation of user interface devices 18.

In some embodiments, the user interface devices 18 are configured to provide a user interface, processing capabilities, databases, and/or electronic storage to the system 10. As such, the user interface devices 18 may include the processor 20, the electronic storage 22, the external resources 24, and/or other components of the system 10. In some embodiments, the user interface devices 18 are connected to a network (e.g., the Internet). In some embodiments, the user interface devices 18 do not include the processor 20, the electronic storage 22, the external resources 24, and/or other components of the system 10, but instead communicate with these components via dedicated lines, a bus, a switch, network, or other communication means. The communication may be wireless or wired. In some embodiments, the user interface devices 18 are laptops, desktop computers, smartphones, tablet computers, and/or other user interface devices.

Data and content may be exchanged between the various components of the system 10 through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the Internet Protocol (IP) defines addressing methods and structures for datagram encapsulation. Of course other protocols also may be used. Examples of an Internet protocol include Internet Protocol Version 4 (Ipv4) and Internet Protocol Version 6 (Ipv6). In another example, data may be exchanged employing a protocol used for communicating data across satellites and/or coaxial cables.

In some embodiments, the processor 20 may belong to a user device, a consumer electronics device, a mobile phone, a smartphone, a personal data assistant, a digital tablet/pad computer, a wearable device, a personal computer, a laptop computer, a notebook computer, a work station, a server, a vehicle computer, a game or entertainment system, a set-top-box or any other device. As such, the processor 20 is configured to provide information processing capabilities in system 10. The processor 20 may comprise one or more of a digital processor, an analog processor, a digital circuit designed to process information, an analog circuit designed to process information, a state machine, and/or other mechanisms for electronically processing information. Although FIG. 1 illustrates the at least one processor 20 as a single entity, the at least one processor 20 may alternatively comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices). As shown in FIG. 1, the processor 20 may be configured via machine-readable instructions to execute one or more computer program components. Although the present application describes computerized processes described by a single processor, it should be readily understood that one or more (or all) of the processes may be performed jointly or independently by a plurality of processors 20.

User devices 90, depicted in FIG. 1, may consume content provided by content distributors 100 and/or content sources 50. User devices 90 may be of different types (e.g., televisions and projectors) that consume content via network 80 and/or network 70. The user devices 90 may include or be in communication with receivers 85 that may be configured to receive media content from content distributors 100 and transmit the media content to one or more display components of user devices 90. The receivers 85 may be set-top boxes (STBs) that receives and manages content from content sources 50 to be viewed on the user devices 90. For example, receivers 85 may include external cable television converters configured to receive media content via a coaxial cable and transmit the media content to a television. The receivers 85 may be configured to manage video-on-demand (VOD) content. The receivers 85 may, additionally or alternatively, embody a digital video recorder (DVR), a digital media receiver (DMR), an internal tuner, and/or a satellite receiver. Content distributors 100 may thus include satellite television operators, local or regional broadcasters, and/or any other distributors of media content through network 80 and/or network 70. Additionally or alternatively, the user device 90 may include a handheld device 90-1, a laptop 90-2, a desktop computer **90-*n*, and/or built-in device 90-*n***

(in a mobile vehicle such as a motor vehicle or in a gaming device) that directly accesses the network 80.

In some embodiments, the receivers 85 and/or user devices 90 may be configured to generate tuning data indicative of media content accessed and displayed on the user devices 90. The receivers 85 and/or user devices 90 may be configured to save the tuning data, for example, in an internal data storage (which may subsequently be accessed via network 70) and/or transmit the tuning data to processor 20 and/or content distributors 100 (via network 80 or network 70). The tuning data may be indicative of content (e.g., movies, television shows, music, or other media) accessed by receivers 85 through content distributors 100. The tuning data may also be indicative of media content accessed by offline user(s), such as content accessed from an internal storage device of the DVR.

The tuning data may include, for example, one or more channels accessed, the media content outputted to display component(s) of user devices 90, a time-date stamp associated with the accesses (e.g., the date/time the access began, ended, and/or duration), and/or other information descriptive of the access. The time-date stamp may be stored in a number of different formats, such as the number of seconds elapsed since a reference time.

As used herein, "channel" may refer to any identifier of a particular source of video content, for example: a network name (e.g., ABC or CBS), a broadcast organization's call sign (e.g., KOMO-TV), an analog or digital broadcast or demodulation frequency (e.g., 615.25 MHz), a "real" channel (which may correspond to an actual transmission frequency (e.g., 38), a "virtual" channel (not representing an actual frequency, e.g., SiFy channel), a main channel by itself (e.g., 4), a sub channel number by itself (e.g., 0.1), a main channel combined with a sub channel (e.g., 4.1), a digital networking address such as an internet protocol (IP) address, a uniform resource locator (URL), a video sharing website channel (such as a YouTube user's content channel), a content identifier (e.g., Superbowl 2019, Seinfeld season 3, episode 2, or the name of a pay-per-view program), or any other content identifier utilized for cable television, broadcast television, satellite television, Internet viewing, and/or other content viewing.

The at least one processor 20 may be configured to receive (e.g., irregularly, periodically, or on request) the tuning data from content sources 50, content distributors 100, third-party aggregators of tuning data (not shown), receivers 85 via network 80, and/or user devices 90 via network 70. The at least one processor 20 may save the tuning data as viewership data within the database 60. By analyzing the tuning data, the processor 20 may be configured to determine viewing habits, such as the duration that the media content is accessed, a particular source that is accessing the content, and/or a type of media content. The tuning data may also provide such information as channel changes, recording or replaying of media content, and changes in playback of content. In some embodiments, the networks 70 and/or 80 may facilitate content viewership over a plurality of different channels that respectively pertain to a plurality of different content sources.

The at least one processor 20 may be configured to access the database 60 of household data including names and/or other identifying information of members (e.g., users) of the households associated with receivers 85 and/or user devices 90. Accordingly, the content distributors 100 may be configured to correlate the receivers 85 and/or user devices 90 to the associated household and/or members of the household. The tuning data may also be associated with a unique identifier, so that the tuning data is attributable to the respective receiver 85 and/or user device 90. The unique identifier may be an identifier of the customer premises equipment (e.g., the MAC address of receiver 85 or of user device 90), an identifier of a user associated with the user device 90 and/or with the receiver 85 (e.g., a cable television customer account number, phone number, etc.), a globally unique identifier ("GUID"), the address of the physical location of the display component, and/or similar identifying elements. Each of the members of the households may be assigned to a demographic (e.g., male of age 18-34). Thus, the database 60 may include household data including a number of members and demographic information for each of the members. The tuning data of the database 60) may be assigned to the households and/or members of the households. The processor 20 may be configured to generate a viewership distribution of the households. For example, the processor 20 may compile the tuning data from the receiver 85 and/or user device 90 associated with each household to determine the proportion of the content or channel being watched at the household level. The processor 20 may, additionally or alternatively, normalize the tuning data from the receiver 85 and/or user device 90 over a predetermined period time to determine a percentage of content viewership. Furthermore, the processor 20 may determine the viewership distribution of each of the members of the household, as discussed herein.

The tuning data may be generated at least in part from panel data obtained from "panelist households" who, in at least some cases, have agreed to have their viewing behavior actively and/or passively, directly monitored. For example, television viewership of the panelist household may be measured by monitoring software installed on the receiver 85 and/or user device 90 (e.g., STBs) of the panelist household that logs tuning data. For example, the panel data may be generated by a device connected to the receiver 85 and/or user device 90 where viewers indicate they are present by pushing a button or logging in with a remote control or mobile device. Additionally or alternatively, the panel data may be done semi-passively, by having household members carry around a "portable people meter" (PPM)—a device that can be carried on their person, that listens for the audio from media content and identifies it by watermarking or audio content recognition (ACR) technology.

Due to the direct access to the device, the panel data may provide a rich dataset accurately detailing viewing events of the members of the panelist households. The tuning data may also incorporate other user devices 90 (e.g., an iPad) associated with the panelist household by connecting to a household network router with installed monitoring software. The panelist tuning data may further include tuning data of user devices 90 (e.g., mobile phones) that are registered to a member of the panelist household and accessed data through a cellular network. The panelist viewing data may include return path data (RPD), which is a passive data collection technique that collects any user/viewer activity collected from a device defined by a start time and a duration. The tuning data may be aggregated to provide a feature-rich data set of the viewership of the membership of the household, in accurate media that real individuals are consuming. Furthermore, the tuning data and/or panelist households may also be maintained current by providing a threshold of activity. For example, only panelist households with viewing data within the past 30 or 60 days may be compiled in the tuning data. However, since the panelist tuning data is mainly received from a self-selecting population (panelists), the panelist tuning data itself does not provide an indication of tuning data of an overall geographic market. Furthermore, the panelist tuning data may indicate what was watched, when it was watched, how much was watched, and some person level distribution. However, the panelist tuning data may still not provide a complete picture of what members of the panelist household is viewing the content, for example, due to co-viewing of a user device 90 by multiple members of the household.

The herein disclosed prediction model may be trained using Training data obtained by the processor 20 from database 60, shown in FIG. 1. This training data obtained from database 60 of FIG. 1 may comprise thousands, millions, or even billions of data points (e.g., number of hours viewed, normalized average audience, and features of the viewings). In some embodiments, the dataset may be split between training, validation, and testing datasets in any suitable fashion. That is, the obtained data may be split into a training dataset and a testing dataset for the presently disclosed machine learning model. For example, the split may be by a ratio of 120:1, as exemplarily depicted in FIG. 4A. In some embodiments, the split is in time order. The target day, in relation to which system 10 endeavors to predict or validate, person level viewership. The validation or testing dataset may be a subset of the training dataset, which may be kept hidden from the model to test accuracy of the model. The test dataset may be a dataset that is new to the model, to test accuracy of the model.

Some embodiments may gather tuning information from many (e.g., tens of millions) households subscribed to distributors or to television service providers, which report at least some of such information. These distributors and television providers may operate in one or more of several dozen (e.g., hundreds) markets. Some embodiments may then project the reporting data out to measure viewership, with respect to television stations and cable networks, across substantially all households of a region or country. In these or other embodiments, tuning data may be reported, collected, and projected with respect to OTT content providers. The presently disclosed machine learning approach operates by learning from observations of the independent variables. The disclosed machine-learning may be performed as computer-based data analysis, i.e., between a cause (independent variable) and an outcome (dependent variable). The processor 20 may be configured to analyze training data obtained from database 60 and learn a model that generalizes a relationship between the different types of variables. In some embodiments, the processor 20 is configured to obtain training viewership data from content sources 50, content distributors 100, user devices 90, electronic storage 22, external resources 24, database 60, and/or via user interface device(s) 18. The processor 20 may use the tuning data from the panelists housings to train 30) one or more prediction models that may enable prediction of person level viewership. Once trained, the model(s) may be stored in database 60, as shown in FIG. 1, and then used to make predictions and to validate existing viewership data based on a normalized average audience and one or more features.

Figure 2:
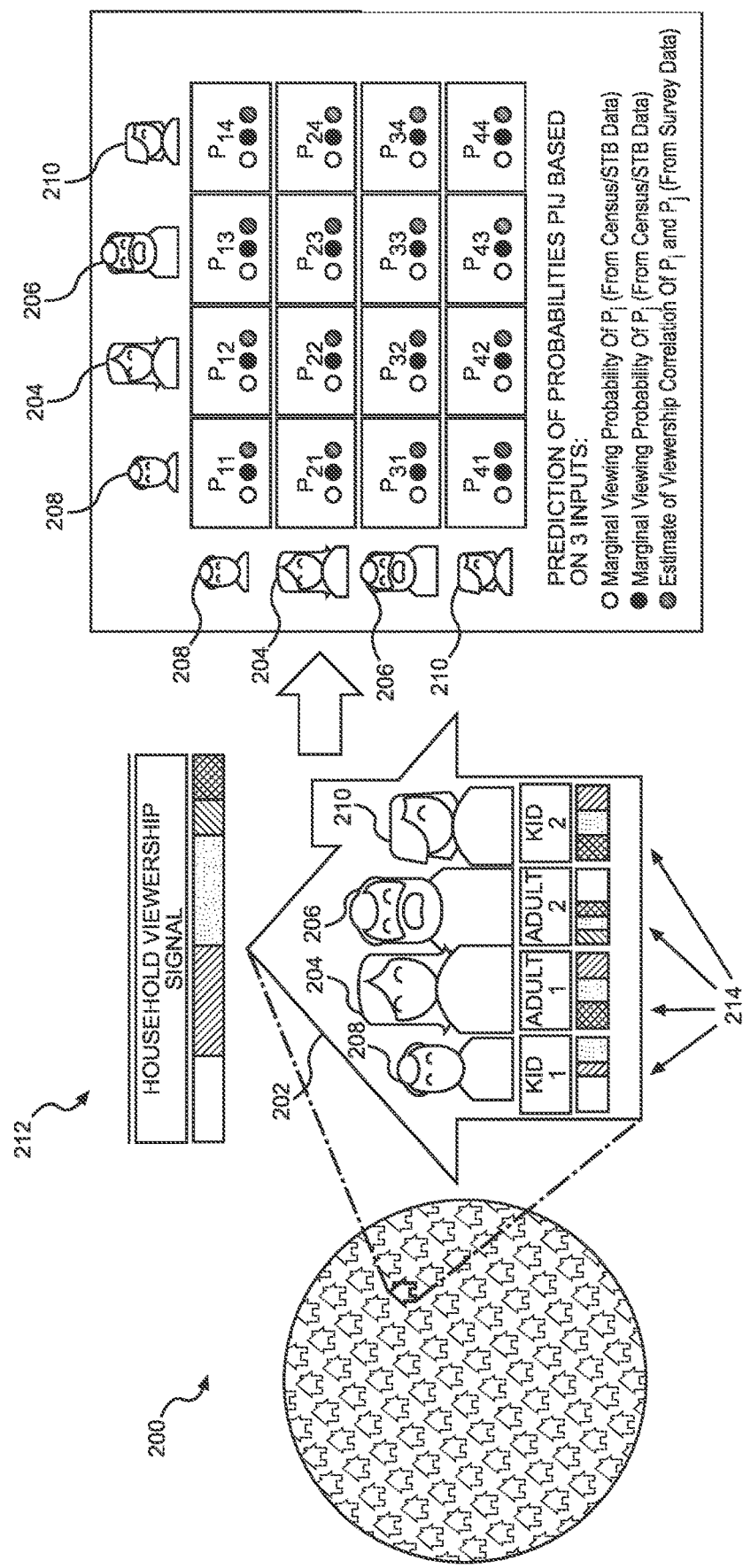
FIG. 2 illustrates a schematic of data processing with regard to an exemplary household composed of a number of members.

FIG. 2 illustrates a schematic 200 of an exemplary household 202 of four members including a first adult 204, a second adult 206, a first child 208, and a second child 210, each of the members belonging to a particular known demographic group (e.g., based on age and/or gender). For example, the demographic of each of the members may be based on five strata, including 12-17, 18-34, 35-49, 50-64, and 65+ years of age. The demographic of each of the members may also be based on gender, including male and female. The household 202 may be one out of the 30+ million households that can be measured on any given day. The schematic further illustrates a household distribution 212 that represents a distribution of viewership of a plurality of pieces of content with the length of the bar representing the duration of viewership for each content. For example, the first bar may represent an episode of SpongeBob SquarePants, and the second bar represents a late-night news program. The household distribution 212 may be determined by compiling the tuning data from a plurality of receivers 85 and/or user devices 90 associated with each household to determine the proportion of the content or channel being watched at the household level. The household distribution 212 may be normalized over a predetermined period of time such as a day, a month, and/or a year. Thus, the household distribution 212 may indicate the percentage of time that the household views a content based on the total number of household viewing hours over the predetermined period of time. Furthermore, the household distribution 212 may indicate the probability that a specific content is being viewed by the household when a user device associated with the household is displaying content.

The household distribution 212 is populated by member distributions 214 indicative of the viewership of the individual members 204-210 of the household. Each of the members 204-210 have their own tendencies and interests in viewing content, which can be unique and overlapping due to potential co-viewership with other members 204-210. For instance, all four members watched somewhat of similar proportions of one of the pieces of content. Only the kids watched another of the pieces of content and, in the same way, only the second adult 206 watched the content marked a third of the pieces of content. The member distributions 214 are often not directly observed from the tuning data because it can be difficult to determine which of the members 204-210 of the household are viewing a specific content on a receiver 85 and/or user device 90 generating the tuning data. The predictive models of the present application are configured to extract person level viewing data based on the tuning data aggregated for the household.

Furthermore, the system 10 may determine from the household signal/distribution conditioned on the presence of one or more demographic characteristics (ex: presence of at least one male 18-34 in three-member households). In some embodiments, the prediction model may be based on the Bayes Theorem. Aggregating data across millions and millions of households, the system 10 may calculate a Probc (H|P) being the probability of household viewing distribution of content "c" for a given person demographic viewing propensities, conditioned on the (unknown) person viewing distributions. The system 10 may then determine, with the Bayes Theorem, a Probc (P|H) in the person demographic viewing probabilities, given the observed HH-level viewing distribution based on membership data of the household. Using augmented data sources such as surveyor subset of observed households, the system 10 may derive candidate set of person level demo distributions and co-viewing estimates and use them within the prediction models for estimating—the probability of a person level demo viewing of content "c", conditional on the observed household distribution. The framework may provide the flexibility to calibrate the prediction models when better quality first or third-party data assets become available for use as inputs to the algorithms.

Figure 3:
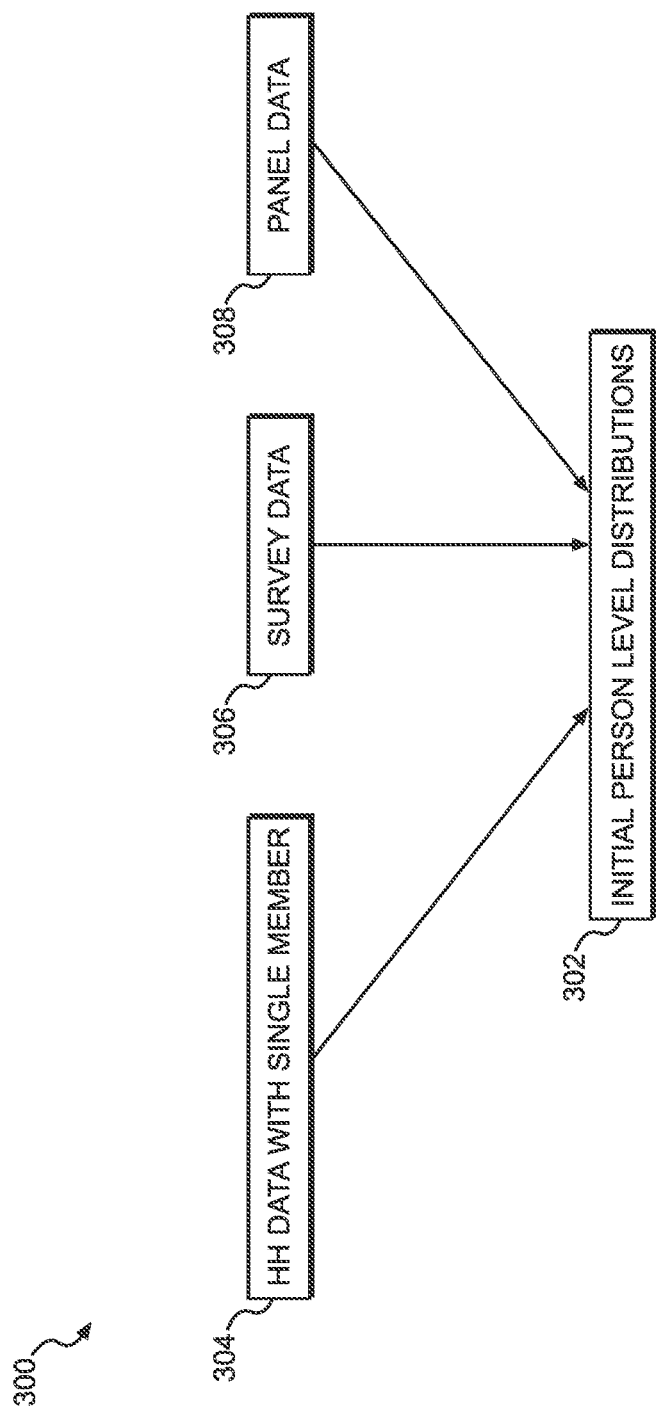
FIG. 3 illustrates a flow chart of a determination of initial person level distributions.

FIG. 3 illustrates a flow chart of factors that may contribute to initial person level distributions 302. As illustrated, the initial person level distributions 302 may be based on tuning data from household data with a single member 304, survey data 306, and/or panel data 308. For example, the person level distribution from household data with a single member 304 may be indicated by the tuning data of that household, in that it can be presumed that the tuning data recorded by the devices 90 and/or receivers 85 from the single member households characterizes the content that the single member views. The person level distributions may also be generated by survey data 306 received from a user. The survey data 306 may be obtained through randomly generated surveys on viewership habits. The survey data 306 may, additionally or alternatively, be more targeted in that a member of a household (e.g., a panelist household) is sent a survey after the system 10 observes that a specific content was viewed on the receiver 85 and/or user device 90 associated with the household. The survey may ask the individual for content that the individual recently viewed, and viewership may thus be confirmed if the individual selects the content that was observed. The user may have to choose the viewed content from a list including unrelated content to ensure accuracy. The panel data 308 may be based on tuning data that can be confirmed or strongly correlated to the viewership of a member of a panelist household, as discussed herein. For example, the panel data 308 may include tuning data from a smart phone registered to a user, indicating a strong correlation to the person level distributions of that user. The person level distributions based on the factors 304-308 may be saved in the database 60 according to demographics of the respective user in an attempt to extrapolate viewership of users in a broader market.

However, the factors 304-308 may not provide a complete picture of the person level distribution of that user and/or other individuals of the same or similar demographic. The present inventor recognizes that this may be at least in part due to co-viewership when multiple members of the same household are viewing the same content at the same time. Indeed, the viewing habits of users may change depending on other members of the household. For example, the present inventor has found that personal viewership is "clumpy" in that the viewership is shaped by the number of members of the household and/or combinations of the members that view content. Thus, the users may be exposed to content that is not according to their preferences, such as viewership of SpongeBob SquarePants by an adult male solely due to the presence of a child. Therefore, the actual viewership of content such as SpongeBob SquarePants may be greater for demographics of men than measurable for example in single households of the same demographic. The size of the household is clearly an important factor: a single-person household, by definition, can only have a single resident viewer. A set of two-person households can average anywhere between one and two viewers, which is to say the "co-viewing factor" can be between 1.0 and 2.0. For many types of content, it ends up landing in the 1.3 range. Three-person households will have co-viewing factors between 1.0 and 3.0, and tend to be around 1.5. And so forth. But even accounting for household size in addition to the demographic probabilities, naïve co-viewing estimates tend to be somewhat low, due to the "clumpiness" described above. The present application captures this viewership through processing tuning data in view of demographic member compositions of the households.

FIG. 4 illustrates a schematic of exemplary datasets 400 of implied household distributions based on demographic person level distribution of the members. As illustrated, the system 10 may be configured to generate a database 410 of person level distributions, including a demographic identifier 412, a demographic 414, and a probability of viewership of a particular content "c" 416. The system 10 may also generate datasets 420 for each of a plurality of households, including a household identifier 422, a household size 424, and fields for each of the members (e.g., p1, p2, p3) including a demographic identifier 426 for each member. Each of the household datasets 420 may include an implied household viewership distribution of the content "c" ($Prob_c$ (H|P)) 428 calculated by a prediction model based on the person level distribution associated with one or more members of the household. For example, the datasets 420 for each of Household 1 (HH1) and Household 2 (HH2) indicate single member households, such that the implied household viewership distribution 428 is indicated to be the probability of viewership 416 of the individual member. However, this implied household viewership distribution 428 may not match the observed household viewership distribution from the tuning data, due to the variability of tuning data among people of a given demographic and/or varying household environments of the users. The dataset of Household 3 (HH3) indicates the implied household viewership distribution 428 calculated by the prediction model based on a household of three members each aged 18-34. The implied household viewership distribution 428 indicates that HH3 the probability of household viewership of the content "c" would be 0.488. Similarly, the dataset of Household 4 (HH4) indicates that the implied household viewership distribution 428 of the content "c" would be 0.76 based on one member of age 65+ and one member of age 18-34. It should be evident that the prediction models may vary based on the size and/or member composition of the households. Thus, a plurality of the predictive models may be stored in the database 60, and processor 20 may choose one of the predictive models associated with the member composition of the household.

Figure 5:
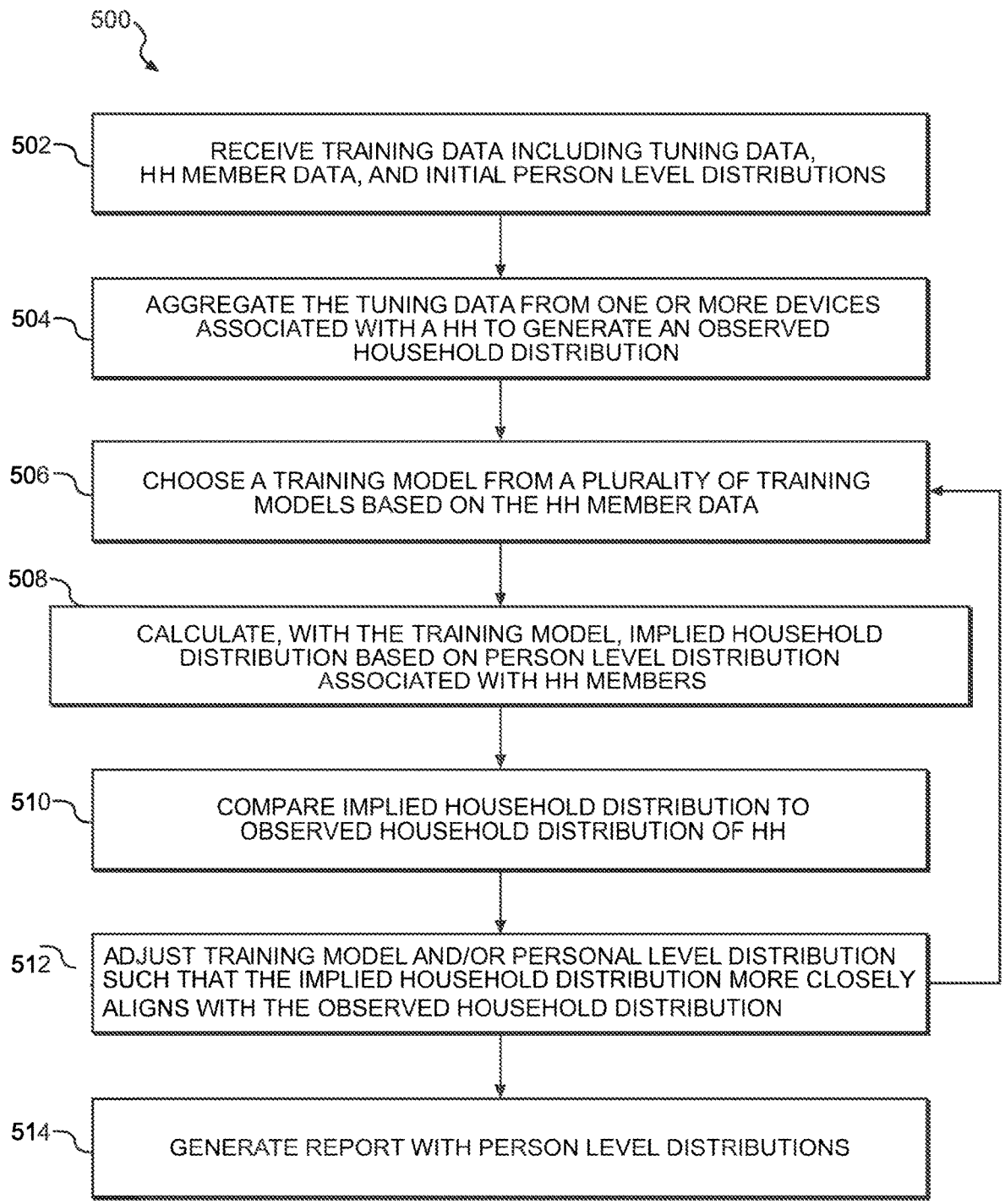
FIG. 5 illustrates a flow chart of a method of personifying viewership data.

FIG. 5 illustrates a flow chart of a method of personifying viewership data. In step 502, the processor 20 may receive training data including tuning data, household membership data, and initial person level distributions. The training data may be based on data received from panelists households due to the feature-rich data obtainable from the panelist households, as discussed above. Thus, the tuning data may be received by monitoring, via panelist software executed on the user device 90 and/or receiver 85, viewing events displayed by the user device 90 and/or receiver 85 for a panelist household and generating the tuning data based on the viewing events. The initial person level distributions received in Step 502 may be based on demographics (e.g., gender and/or age) and include one or more of household data with a single member, survey data, and/or panel data. In step 504, the processor 20 may aggregate the tuning data from one or more user devices 90 (including receivers 85) associated with the household to generate an observed household distribution. Furthermore, the processor 20 may normalize the tuning data over a predetermined period of time to determine a percentage of time that the household views a content based on the total number of household viewing hours over the predetermined period of time. In step 506, the processor 20 may choose a prediction model from a plurality of prediction models based on the household membership data, such as a number of members in the household and/or a demographic of at least one of the members. The chosen prediction model may be based on n-way co-viewership, where n is the number of members of the household. For example, households with more members would likely have more co-viewership thus shaping the prediction model. In step 508, the processor 20 may calculate, with the prediction model, the implied household distribution based on the person level distribution associated with members of the household. In step 510, the processor 20 may compare the implied household distribution to the observed household distribution. In step 512, the processor 20 may adjust the prediction model and/or the person level distribution to more closely align with the observed household distribution.

Steps 506-512 may be repeated a number of times based on a number of households to obtain a desired accuracy, for example based on a threshold of variation in the data. The person level distribution may be based on demographics and thus training data from any number of households may be applied in steps 506-512 to update and refine the person level distribution to provide high resolution data according to gender and/or age groups of individuals. Steps 506-512 including the prediction model may be performed according to machine-learning techniques, such as deep neural networks, artificial neural networks, and/or other neural networks, as discussed herein. Additionally or alternatively, steps 506-512 may be performed based on conditional probability by applying the Bayes Theorem. In step 512, the processor 20 may generate a report with the person level distributions. The reports may be transmitted for example to the content distributors 100 for further processing.

While systems and methods have been described in connection with the various embodiments of the various figures, it will be appreciated by those skilled in the art that changes could be made to the embodiments without departing from the broad inventive concept thereof. It is understood, therefore, that this disclosure is not limited to the particular embodiments disclosed, and it is intended to cover modifications within the spirit and scope of the present disclosure as defined by the claims.

What is claimed is:

1. A method comprising:
receiving training data including tuning data, household member data, and initial person level viewership distribution data;
aggregating the tuning data from one or more user devices associated with a household to generate an observed household viewership distribution;
calculating, via a prediction model, an implied household viewership distribution based on the initial person level viewership distribution data associated with one or more members of the household;
comparing the implied household viewership distribution to the observed household viewership distribution;
adjusting, based on the comparison of the implied household viewership distribution to the observed household viewership distribution, the prediction model and/or the initial person level viewership distribution data such that the implied household viewership distribution more closely aligns with the observed household viewership distribution;
calculating an updated implied household viewership distribution based on the adjusted prediction model and/or the adjusted person level viewership distribution data;
comparing the updated implied household viewership distribution to the observed household viewership distribution;
adjusting, based on the comparison of the updated implied household viewership distribution to the observed household viewership distribution, the adjusted person level viewership distribution data such that the updated implied household viewership distribution more closely aligns with the observed household viewership distribution; and
generating a report with the readjusted person level viewership distribution data.

2. The method of claim 1, wherein the initial person level viewership distribution data is based on demographics including at least one of age or gender.

3. The method of claim 1, further comprising normalizing the tuning data over a predetermined period of time to determine a percentage of time that the household views a content based on the total number of household viewing hours over the predetermined period of time.

4. The method of claim 1, wherein the observed household viewership distribution is independent of the temporal order of the tuning data.

5. The method of claim 1, further comprising:
monitoring, via panelist software executing on a user device and/or a receiver, viewing events displayed by the user device and/or the receiver for a panelist household; and
generating the tuning data based on the viewing events.

6. The method of claim 1, wherein the prediction model is based on n-way co-viewership, where n is the number of members of the household.

7. The method of claim 1, wherein the initial person level viewership distribution data is based on one or more of household data with a single member, survey data, and/or panel data.

8. The method of claim 1, further comprising selecting the prediction model from among a plurality of prediction models based on a number of members in the household and/or a demographic of at least one of the members.

9. The method of claim 1, wherein the prediction model is used to calculate the implied household viewership distribution according to a machine-learning technique.

10. A system comprising:
at least one processor;
at least one memory comprising instructions, which when executed by the at least one processor, cause the at least one processor to:
receive training data including tuning data, household member data, and initial person level viewership distribution data;
aggregate the tuning data from one or more user devices associated with a household to generate an observed household viewership distribution;
calculate, via a prediction model, an implied household viewership distribution based on the initial person level viewership distribution data associated with one or more members of the household;
compare the implied household viewership distribution to the observed household viewership distribution;
adjust, based on the comparison of the implied household viewership distribution to the observed household viewership distribution, the prediction model and/or the initial person level viewership distribution data such that the implied household viewership distribution more closely aligns with the observed household viewership distribution;
calculate an updated implied household viewership distribution based on the adjusted prediction model and/or the adjusted person level viewership distribution data;
compare the updated implied household viewership distribution to the observed household viewership distribution;

adjust, based on the comparison of the updated implied household viewership distribution to the observed household viewership distribution, the adjusted person level viewership distribution data such that the updated implied household viewership distribution more closely aligns with the observed household viewership distribution; and generate a report with the readjusted person level viewership distribution data.

11. The system of claim 10, wherein the initial person level viewership distribution data is based on demographics including age and/or gender.

12. The system of claim 10, wherein the instructions, when executed, further cause the at least one processor to normalize the tuning data over a predetermined period of time to determine a percentage of time that the household views a content based on the total number of household viewing hours over the predetermined period of time.

13. The system of claim 10, further comprising a user device and/or receiver including panelist software configured to monitor viewing events displayed by the user device and/or the receiver of a panelist household,
wherein the instructions, when executed, further cause the at least one processor to generate the tuning data based on the viewing events.

14. The system of claim 10, wherein the initial person level viewership distribution data is based on one or more of household data with a single member, survey data, and/or panel data.

15. The system of claim 10, wherein the instructions, when executed, further cause the at least one processor to select the prediction model from among a plurality of prediction models based on a number of members in the household and/or a demographic of at least one of the members.

16. A non-transitory computer-readable medium storing instructions which, when executed by at least one processor, cause the at least one processor to:
receive training data including tuning data, household member data, and initial person level viewership distribution data;
aggregate the tuning data from one or more user devices associated with a household to generate an observed household viewership distribution;
calculate, via a prediction model, an implied household viewership distribution based on the initial person level viewership distribution data associated with one or more members of the household;
compare the implied household viewership distribution to the observed household viewership distribution;
adjust, based on the comparison of the implied household viewership distribution to the observed household viewership distribution, the prediction model and/or the initial person level viewership distribution data such that the implied household viewership distribution more closely aligns with the observed household viewership distribution;
calculate an updated implied household viewership distribution based on the adjusted prediction model and/or the adjusted person level viewership distribution data;
compare the updated implied household viewership distribution to the observed household viewership distribution;
adjust, based on the comparison of the updated implied household viewership distribution to the observed household viewership distribution, the adjusted person level viewership distribution data such that the updated implied household viewership distribution more closely aligns with the observed household viewership distribution; and
generate a report with the readjusted person level viewership distribution data.

17. The non-transitory computer-readable medium of claim 16, wherein the initial person level viewership distribution data is based on demographics including age and/or gender.

18. The non-transitory computer-readable medium of claim 16, wherein the instructions, when executed, further cause the at least one processor to normalize the tuning data over a predetermined period of time to determine a percentage of time that the household views a content based on the total number of household viewing hours over the predetermined period of time.

19. The non-transitory computer-readable medium of claim 16, wherein the initial person level viewership distribution data is based on one or more of household data with a single member, survey data, and/or panel data.

20. The non-transitory computer-readable medium of claim 16, wherein the instructions, when executed, further cause the at least one processor to select the prediction model from among a plurality of prediction models based on a number of members in the household and/or a demographic of at least one of the members.

* * * * *